Figures 1, 2:
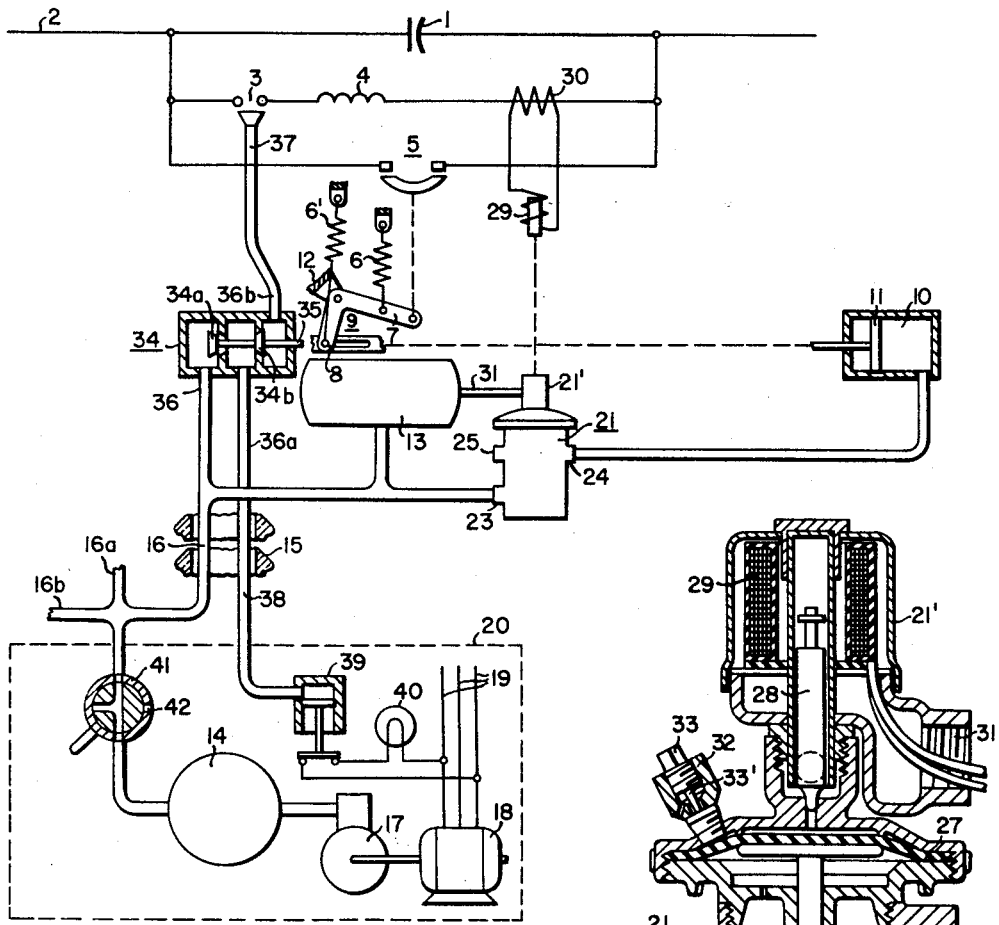

Aug. 18, 1959  R. E. MARBURY  2,900,578
SERIES CAPACITOR PROTECTIVE DEVICE
Filed Feb. 25, 1957

WITNESSES
Edwin E. Bassler
E. H. Liss

INVENTOR
Ralph E. Marbury
BY
ATTORNEY

United States Patent Office

2,900,578
Patented Aug. 18, 1959

2,900,578

SERIES CAPACITOR PROTECTIVE DEVICE

Ralph Eugene Marbury, Pittsburgh, Pa., assignor to Westinghouse Electric Corporation, East Pittsburgh, Pa., a corporation of Pennsylvania Application February 25, 1957, Serial No. 642,067

7 Claims. (Cl. 317—12)

The present invention relates to a self-restoring protective system for series capacitor installations in alternating current lines, and more particularly to a self-restoring protective system in alternating current transmission or distribution lines where series capacitors are used to improve voltage regulation where sudden voltage drops occur by reason of rapid, repetitive, reactive load fluctuations.

Capacitors are often connected in series in alternating current transmission or distribution lines to neutralize part or all of the inductive reactance of the line, in order to improve the voltage regulation of a distribution line. Since such capacitors are connected directly in series in the line and carry the line current, the voltage across the capacitor is proportional to the line current, and in case of a fault of the line, the voltage across the capacitor may rise to many times its normal value. Standard capacitors such as are used in series capacitor installations are capable of withstanding overvoltages of the order of 150% of normal voltage for brief periods, but they cannot be subjected to materially higher overvoltages, even momentarily, without the probability of damage.

It is not practical, because of excessive cost, to utilize capacitors which are capable of withstanding the maximum voltage to which they may be subjected under fault conditions or other excess current conditions. A series capacitor installation, therefore, usually consists of capacitor units having a voltage rating determined on the basis of the normal voltage across the capacitor, together with a protective system for bypassing the capacitor under fault conditions or other excess-current conditions, in order to protect the capacitor against overvoltage. In order to adequately protect the capacitor against overvoltage, the protective system must operate to by pass it substantially instantaneously upon the occurrence of an overvoltage of predetermined magnitude, that is, the capacitor must be effectively by passed within the first half-cycle of faulty current. Because of this requirement of substantially instantaneous operation, spark gaps are usually used in these protective systems since no switch or other device involving moving parts or mechanical movement could operate fast enough.

In the protective systems which have usually been used in connection with series capacitors in distribution lines, a spark gap is connected across the capacitor to break down and bypass it immediately upon the occurrence of a predetermined overvoltage, and a breaker or contactor is provided for bypassing both the gap and the capacitor immediately after the gap has broken down in order to extinguish the arc in the gap and to relieve the gap from excessive heating caused by continued arcing. The breaker is opened to interrupt the bypass circuit to restore the capacitor to service after the line current has fallen to its normal value or after the lapse of a predetermined time interval which is made long enough to allow the protective devices of the line to clear the fault.

Series capacitors are commonly protected with bypass gaps which initiate the closing of a bypass breaker or switch and time delay relays to initiate a reopening of the breaker after a lapse of time. This system is quite satisfactory when the line voltage is 13.8 kv. or less. In the case of higher line voltage, the bypass breaker cost is intolerable if insulated for full line voltage. It is more economical to use remote control breakers and to insulate the breakers from ground than to use breakers with the higher line voltage insulation. Remote control breakers of lower voltage, however, present problems as to power for operation, control from ground level, and breaker supply for automatic reopening of the breaker or manual control from ground level and adjustable time delay in reopening the breaker. The present invention overcomes the disadvantages of the prior protective systems by providing a protective system in which the bypass breaker is controlled from ground level by an electropneumatic system insulated from the line.

An object of the present invention is to provide a protective system for series capacitors using a gap device which shunts the capacitor when an overvoltage occurs and having pneumatic means for effecting shunting of the gap immediately after it has broken down.

A further object of the invention is to provide a protective system for series capacitors using a gap device which shunts the capacitor when an overvoltage occurs, together with pneumatic means for shunting the gap immediately after it has broken down and for removing the shunt to restore the capacitor to service after a definite time interval.

A more specific object of the invention is to provide a protective system for series capacitors having a gap device to shunt the capacitor when an overvoltage occurs, and pneumatic means for shunting the gap immediately after it has broken down and for restoring the capacitor to service after a predetermined time interval, and in which auxiliary manually operated pneumatic means is provided to shunt the gap and to restore it to service.

The invention will be more fully understood from the following detailed description, taken in connection with the accompanying drawings, in which:

Figure 1 is a schematic diagram showing a preferred embodiment of the invention; and Fig. 2 is an enlarged vertical section view of the main valve of this embodiment.

The invention is shown in the drawing as applied for the protection of a series capacitor 1 connected in series with an alternating current line 2. The line 2 may be one phase of a three-phase transmission or distribution line or it may be any other alternating current line in which it is desired to introduce series capacitance. For this purpose a protective spark gap device 3 is provided and an inductance 4 is connected in series with the gap device 3. The series connected gap device 3 and inductance 4 are connected across the series capacitor 1 as shown in Fig. 1 so that when the gap breaks down the inductance 4 is connected in parallel with the capacitor 1. The gap 3 is designed and adjusted to break down and become conducting whenever the instantaneous voltage across the capacitor exceeds the predetermined safe value so that the capacitor 1 is shunted and protected. The inductance 4 serves to limit capacitor discharge current when the gap breaks down, thus preventing excessive transient currents and preventing damage to the capacitor, since the inductance 4 has a damping effect on the capacitor discharge.

It is desirable to bypass the gap device 3 immediately after it has broken down in order to prevent burning of the electrodes and damage to surrounding structures by the arc since it may carry very heavy currents. For this purpose a bypass switch or circuit breaker 5 is also connected across the series capacitor 1 in parallel with the gap device 3 for bypassing the capacitor when the gap breaks down. The bypass switch 5 is biased toward closed position by means of a spring 6 acting through one arm 7 of a bell crank lever 9 as shown in Fig. 1. The bypass switch is actuated by a pneumatic cylinder 10 containing a piston 11 which is connected to the switch 5 by the bell crank lever 9 or in any other suitable manner. The free end of the other arm 8 of bell crank lever 9 is attached by a lost motion or sliding connection to piston 11. Bell crank lever 9 is pivotally mounted at its vertex 12. Spring 6 is secured at one end to arm 7 of bell crank lever 9 intermediate vertex 12 and the free end of arm 7. At its other end spring 6 is attached under tension to a fixed point vertically above the point of attachment to arm 7 in the direction of switch 5 so as to urge the switch to closed position. A second spring 6' is secured to the free end of the bell crank lever 9 at one end and to a fixed point thereabove at its other end. Upon rotation of bell crank lever 9 in either direction, spring 6' passes the dead center pivot point 12 of bell crank lever 9, resulting in rapid, snap action closing or opening of switch or breaker 5.

Although a particular arrangement of a bell crank lever and off-center spring is shown and described for the purpose of illustrating a rapid, snap action breaker movement, it will be obvious to those skilled in the art that other suitable arrangements for obtaining a rapid acting breaker movement may be utilized such as, for example, toggle means, pressure measuring valve means or any other suitable means. The bypass switch 5 is thus biased to closed position by spring 6 and held in open position by means of air pressure admitted to the cylinder 10 from an air tank 13. The air pressure in the cylinder 10 is released in response to overvoltage across the capacitor to allow switch 5 to close and to bypass the capacitor.

The electropneumatic system for effecting operation of the bypass switch 5 includes a main compressed air tank 14 and an auxiliary compressed air tank 13 mentioned above. The gap device 3 and bypass switch 5 and their associated equipment must, of course, be insulated from ground for the full line voltage, and since the line voltage may be quite high in the type of system for which the invention is particularly intended, this means that the gap device and switch are necessarily spaced a considerable distance from any apparatus at ground potential. The air supply from which the piston 11 is operated must be closely adjacent the cylinder 10 in order to avoid the delay incident to bringing the air from a relatively distant tank at ground potential. For this purpose the auxiliary air tank 13 is utilized and is mounted closely adjacent the gap 3 and the cylinder 11 and insulated from ground, preferably by supplying its air pressure through a nonconducting air line 16 housed in a column of insulators 15. Air line 16 extends to the main air tank 14 which is at ground potential.

The main air tank is supplied with air by means of a compressor 17 driven by a motor 18 supplied from any suitable power source 19. The main air tank and compressor with their associated control equipment are preferably placed in a housing, indicated at 20, which may be located at any convenient place. A single main air tank 14 may be utilized to supply the three individual auxiliary air tanks 13 for the three phases of a three-phase installation.

As described above, the bypass switch 5 is normally held in open position by air pressure in the cylinder 10. Air is supplied to the cylinder 10 from the auxiliary air tank 13 through a main valve device 21.

Main valve device 21 is shown in detail in Fig. 2. Main valve 21 has a valve element 22 which connects valve inlet 23 to the outlet 24 when the valve is in the open position shown, and which connects the outlet 24 to an exhaust opening 25 when the valve is in closed position.

The main valve device 21 is biased to open position by means of a compression spring 26. Main valve 21 is provided with a flexible diaphragm 27. Pressure on diaphragm 27 operates valve element 22 to move it to closed position against the force of spring 26, thus connecting outlet 24 to exhaust port 25. Main valve 21 is powered by an auxiliary valve 21' acting upon diaphragm 27. Auxiliary valve 21' is a solenoid operated valve and is integrally associated with valve 21. The valve 21' is normally held in closed position by needle valve element 28 and is operated by a solenoid 29 which is connected to a current transformer 30 in the circuit of gap device 3. When voltage across the capacitor 1 exceeds the break down voltage of the gap 3 the resulting flow of current through current transformer 30 energizes solenoid 29. When energized the solenoid 29 opens the valve 21' by acting on the needle valve element 28 to admit air from the tank 13 through a conduit 31 to the diaphragm 27 of main valve 21, thus moving valve element 22 to closed position. Consequently, the air supply to cylinder 10 is cut off and cylinder 10 is exhausted through the exhaust port 25 of main valve device 21. Springs 6 and 6' then become effective to cause piston 11 to move to the right, as seen in Fig. 1, thereby rapidly closing breaker 5 to shunt gap 3. Since the breaker 5 is closed thereby bypassing gap 3, the air terminates and current ceases to flow through current transformer 30. Solenoid 29 is thereupon deenergized, resulting in the closing of the valve 21'. After valve 21' closes by operation of the needle valve element 28, air is trapped above the diaphragm 27. A calibrated leak valve 32 having a pipe plug 33 provides an outlet port for the air which is trapped. Pipe plug 33 carries a metering pin 33' which controls the leak rate of the air. When valve 21' closes by operation of needle valve element 28, the diaphragm 27 relaxes and allows the leak valve 32 to operate to permit the trapped air to escape. As the air escapes spring 26 operates to reopen main valve 21. Air again passes from main tank 13 through inlet 23 to outlet 24 and into cylinder 10, driving piston 11 to the left, as seen in Fig. 1, thus opening circuit breaker 5. With this arrangement delays of three to five seconds in the reopening of the breaker are easily obtained; and by proper adjustment of pipe plug 33, delays of as much as 30 to 60 seconds can be obtained.

An air operated pressure switch 39 and signal lamp 40 are provided to indicate operation and position of breaker 5. Associated with the signal system is an air blast gap deionizer 37 which delivers a blast of air through the gap when the breaker 5 closes to complete deionization of the gap and to restore its normal break down value in order to prevent unnecessary restriking upon reopening of the breaker. The signal and air blast gap deionizer system comprises a three-way valve 34, a pressure switch 39, a blast nozzle 37 and a signal lamp 40. Valve 34 is supplied with air pressure through an inlet 36 from air line 16. A valve element 34a connects inlet 36 to signal line 38 through outlet 36a and a valve element 34b connects signal line 38 to air blast gap deionizer 37 through exhaust port 36b. Valve elements 34a and 34b are mounted on valve stem 35 which is connected to bell crank lever arm 9 by a link or other suitable means. The position of valve elements 34a and 34b is controlled by operation of bell crank lever 9 and therefore the position of switch 5. When switch 5 is in the normally open position, valve element 34a is open to admit air through signal line 38 to pressure switch 39, causing switch 39 to make electrical contact and indicate the normal open position by lighting of lamp 40. In this position valve element 34b is in closed position.

Upon closing of breaker 5 valve element 34a is closed to cut off the air supply to pressure switch 39, and valve element 34b is opened to exhaust signal line 38 and pressure switch 39 through exhaust port 36b of valve 34 to supply an air blast to gap deionizer 37 to deionize gap 3.

Loss of pressure on switch 39 breaks contact causing the light 40 to go off indicating operation of the breaker to closed position.

The air supply to each phase in the case of a polyphase insulation is carried through air columns 16 to identical electropneumatic systems on each phase as shown in the drawing at 16a and 16b.

Manual operation of the breaker may be effected if desired by a valve such as 41 shown in the drawings which can be closed to shut off the air supply coming from the main tank and to exhaust air from the entire system through the exhaust port 42.

The operation of the protective system should be obvious from the above detailed description. When a predetermined air pressure is built up in the system by the compressor, piston 11 overcomes the bias on spring 6, causing rapid opening of the breaker 5 through operation of bell crank lever 9 which places the series capacitor in service. When a line fault current causes gap 3 to arc over, the solenoid 29 on valve 21' is energized by gap current. This shuts off the air supply and dumps air from cylinder 10 allowing bypass switch 5 to close. The gap 3 protects the capacitor 1 until the switch 5 closes. Closing of switch 5 terminates the arc at the gap 3 while at the same instant signal lamp 40 is deenergized due to loss of air to pressure switch 39. The air from pressure switch 39 is exhausted through valve 34 to the air blast gap deionizer 37 to complete deionization of the gap. Closing of the switch 5 deenergizes solenoid 29 on valve 21'. After a predetermined time delay, valve 21 returns to open position and establishes air pressure in cylinder 10. The switch 5 reopens, placing capacitor 1 back in service and restoring pressure to switch 39.

To operate the switch 5 manually the manually operated valve 41 may be used. It can also be seen that an air pressure drop due to leaks or loss of supply voltage to the motor 18 will close the breaker when the air pressure drops. Storage tank 14 provides air pressure for losses due to intermittent brief intervals of control voltage outage.

Thus an effective protective system for series capacitors is described which provides a rapid opening and closing of the breaker, instantaneous operation, adequate adjustable time delay in reopening the breaker, means of determining the position of the breaker at a remote point, and manual or automatic operation. A preferred embodiment of the invention has been shown and described for the purpose of illustration, but it will be obvious that various modifications may be made within the scope of the invention, and it is to be understood that the invention is not limited to the specific arrangement shown, but in its broadest aspects it includes all equivalent embodiments and modifications.

I claim as my invention:

1. A series capacitor installation for an alternating current line comprising a capacitor adapted to be connected in series in the line, a spark gap device connected across the capacitor and adapted to break down and bypass the capacitor upon the occurrence of a voltage across the capacitor in excess of a predetermined value, switch means connected across the capacitor and the gap device, spring means for biasing said switch means to closed position, means for applying air pressure to the switch means to normally hold the switch means in open position, and means for releasing the air pressure to permit the switch means to move to closed position in response to current flow through the gap device and self-operating means for reapplying the air pressure to reopen the switch means after a predetermined time interval.

2. A series capacitor installation for an alternating current line comprising a capacitor adapted to be connected in series in the line, a spark gap device connected across the capacitor and adapted to break down and bypass the capacitor upon the occurrence of a voltage across the capacitor in excess of a predetermined value, switch means connected across the capacitor and the gap device, spring means for biasing said switch means to closed position, a pneumatic cylinder connected to the switch means, valve means for controlling the supply of compressed air to the cylinder, the valve means normally being in a position to admit air to the cylinder to hold the switch means in open position, and means for actuating the valve means to exhaust air from the cylinder in response to current flow through the gap device to permit the switch means to close, the valve means including self-operating means for returning the valve means to its normal position to readmit air to the cylinder to reopen the switch means after a predetermined time interval.

3. A series capacitor installation for an alternating current line comprising a capacitor adapted to be connected in series in the line, a spark gap device connected across the capacitor and adapted to break down and bypass the capacitor upon the occurrence of a voltage across the capacitor in excess of a predetermined value, switch means connected across the capacitor and the gap device, spring means for biasing said switch means to closed position, a pneumatic cylinder connected to the switch means, valve means for controlling the supply of compressed air to the cylinder, the valve means normally being in a position to admit air to the cylinder to hold the switch means in open position, and means responsive to current flow through the gap device for effecting actuation of the valve means to closed position to shut off the supply of air from the cylinder and to exhaust air from the cylinder to permit the switch means to close, the valve means including self-operating means for returning the valve means to its normal position after a predetermined time interval to readmit air to the cylinder to reopen the switch means.

4. A series capacitor installation for an alternating current line comprising a capacitor adapted to be connected in series in the line, a spark gap device connected across the capacitor and adapted to break down and bypass the capacitor upon the occurrence of a voltage across the capacitor in excess of a predetermined value, switch means connected across the capacitor and the gap device, spring means for biasing said switch means to closed position, a pneumatic cylinder connected to the switch means, valve means for controlling the supply of compressed air to the cylinder, the valve means normally being in a position to admit air to the cylinder to hold the switch means in open position, means for actuating the valve means to exhaust air from the cylinder in response to current flow through the gap device to permit the switch means to close, the valve means including self-operating means for returning the valve means to its normal position to readmit air to the cylinder to reopen the switch means after a predetermined time interval, and a second valve means for controlling the supply of air to the first-mentioned valve means and cylinder to effect closing and reopening of the switch means independently of operation of the first-mentioned valve means.

5. A series capacitor installation for an alternating current line comprising a capacitor adapted to be connected in series in the line, a spark gap device connected across the capacitor and adapted to break down and bypass the capacitor upon the occurrence of a voltage across the capacitor in excess of a predetermined value, switch means connected across the capacitor and the gap device, spring means for biasing said switch means to closed position, a pneumatic cylinder connected to the switch means, valve means for controlling the supply of compressed air to the cylinder, the valve means normally being in a position to admit air to the cylinder to hold the switch means in open position, means for actuating the valve means to exhaust air from the cylinder in response to current flow through the gap device to permit the switch means to close, the valve means including self-operating means for returning the valve to its normal position to readmit air to the cylinder to reopen the switch means after a predetermined time interval, and means actuated in response to closing of the switch means for effecting deionization of the gap device.

6. A series capacitor installation for an alternating current line comprising a capacitor adapted to be connected in series in the line, a spark gap device connected across the capacitor and adapted to break down and bypass the capacitor upon the occurrence of a votlage across the capacitor in excess of a predetermined value, switch means connected across the capacitor and the gap device, spring means for biasing said switch means to closed position, a pneumatic cylinder connected to the switch means, valve means for controlling the supply of compressed air to the cylinder, the valve means normally being in a position to admit air to the cylinder to hold the switch means in open position, means for actuating the valve means to exhaust air from the cylinder in response to current flow through the gap device to permit the switch means to close, the valve means including self-operating means for returning the valve means to its normal position to readmit air to the cylinder to repoen the switch means after a predetermined time interval, and means actuated in response to closing of the switch means for directing a blast of compressed air into the gap device.

7. A series capacitor installation for an alternating current line comprising a capacitor adapted to be connected in series in the line, a spark gap device connected across the capacitor and adapted to break down and bypass the capacitor upon the occurrence of a voltage across the capacitor in excess of a predetermined value, switch means connected across the capacitor and the gap device, spring means for biasing said switch means to closed position, means for applying air presure to the switch means to normally hold the switch means in open position, and means for releasing the air pressure to permit the switch means to move to closed position in response to current flow through the gap device and self-operating means for reapplying the air pressure to reopen the switch means after a predetermined time interval, and means associated with said spring means to effect snap action of said switch upon opening or closing.

References Cited in the file of this patent

UNITED STATES PATENTS

| | | |
|---|---|---|
| 2,576,132 | Marbury | Nov. 27, 1951 |
| 2,584,710 | Johnson | Feb. 5, 1952 |